United States Patent
Patel et al.

(10) Patent No.: US 10,346,578 B2
(45) Date of Patent: Jul. 9, 2019

(54) PLACEMENT-BASED CONGESTION-AWARE LOGIC RESTRUCTURING

(71) Applicant: Synopsys, Inc., Mountain View, CA (US)

(72) Inventors: Jagat B. Patel, Palo Alto, CA (US); William Clark Naylor, Jr., San Jose, CA (US); Brent L. Gregory, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/801,319

(22) Filed: Nov. 1, 2017

(65) Prior Publication Data

US 2018/0121591 A1    May 3, 2018

Related U.S. Application Data

(60) Provisional application No. 62/416,053, filed on Nov. 1, 2016.

(51) Int. Cl.
*G06F 17/50* (2006.01)

(52) U.S. Cl.
CPC ........ *G06F 17/5077* (2013.01); *G06F 17/505* (2013.01); *G06F 17/509* (2013.01); *G06F 17/5031* (2013.01); *G06F 17/5072* (2013.01); *G06F 17/5081* (2013.01); *G06F 2217/84* (2013.01)

(58) Field of Classification Search
CPC ............. G06F 17/5068; G06F 17/5072; G06F 17/5077; G06F 17/5081

USPC .......................................... 716/110, 119, 126
See application file for complete search history.

(56) References Cited

U.S. PATENT DOCUMENTS

| | | | |
|---|---|---|---|
| 6,671,864 B2 | 12/2003 | Teig et al. | |
| 6,892,371 B1 | 5/2005 | Teig et al. | |
| 7,076,755 B2 | 7/2006 | Ren et al. | |
| 7,266,796 B1 | 9/2007 | Chu et al. | |
| 8,689,164 B2 | 4/2014 | Balabanov et al. | |
| 2007/0300193 A1* | 12/2007 | Lillis | G06F 17/5072 716/113 |
| 2009/0241082 A1* | 9/2009 | Amundson | G06F 17/505 716/122 |
| 2014/0189630 A1* | 7/2014 | Viswanath | G06F 17/5072 716/129 |

(Continued)

OTHER PUBLICATIONS

Huang et al.; "Detailed-Routing-Driven Analytical Standard-Cell Placement", Design Automation Conference (ASP-DAC), 2015 20th Asia and South Pacific, IEEE 2015.

*Primary Examiner* — Paul Dinh
(74) *Attorney, Agent, or Firm* — Park, Vaughan, Fleming & Dowler LLP; Laxman Sahasrabuddhe (57) ABSTRACT

Systems and techniques for optimizing an integrated circuit (IC) design are described. Some embodiments can transform a circuit design into a logically-equivalent circuit design by: (1) creating a Wire-Length-Area Model (WLAM) for a portion of a first circuit design, (2) creating a second circuit design by replacing the portion of the first circuit design by the WLAM, (3) placing and routing the second circuit design to obtain a placed-and-routed second circuit design, and (4) creating a third circuit design that is logically-equivalent to the first circuit design based on the placed-and-routed second circuit design.

15 Claims, 7 Drawing Sheets

(56) References Cited

U.S. PATENT DOCUMENTS

2015/0213188 A1* 7/2015 Chowdhury ........ G06F 17/5081
                                                              716/114

\* cited by examiner

PLACEMENT-BASED CONGESTION-AWARE LOGIC RESTRUCTURING

RELATED APPLICATION

This application claims benefit of U.S. Provisional Application Ser. No. 62/416,053, filed on 1 Nov. 2016, by the same inventors, the contents of which are herein incorporated by reference in their entirety for all purposes.

BACKGROUND

Technical Field

This disclosure relates to integrated circuits (ICs). More specifically, this disclosure relates to optimization in IC designs.

Related Art

Advances in process technology and an almost unlimited appetite for consumer electronics have fueled a rapid increase in the size and complexity of IC designs. Software tools can be used to perform various operations on IC designs, e.g., creating and editing schematics and layouts, synthesizing, optimizing, and verifying IC designs, etc. What are needed are high-performance user-friendly software tools that enable an IC designer to create IC designs that reduce the overall IC design time and/or improve the overall quality of results (QoR).

SUMMARY

Some embodiments described herein feature systems and techniques for optimizing an IC design. Some embodiments can transform a circuit design into a logically-equivalent circuit design by: (1) creating a Wire-Length-Area Model (WLAM) for a portion of a first circuit design, (2) creating a second circuit design by replacing the portion of the first circuit design by the WLAM, (3) placing and routing the second circuit design to obtain a placed-and-routed second circuit design, and (4) creating a third circuit design that is logically-equivalent to the first circuit design based on the placed-and-routed second circuit design. Performing placement and routing on the third circuit design results in substantially less routing congestion than performing placement and routing on the first circuit design.

In some embodiments, placing and routing the second circuit design to obtain a placed-and-routed second circuit design comprises using a Steiner router. In some embodiments, creating the third circuit design that is logically-equivalent to the first circuit design based on the placed-and-routed second circuit design comprises placing logic gates on Steiner points in the placed-and-routed second circuit design.

In some embodiments, timing metrics, leakage power metrics, and area metrics of the third circuit design are optimized by (1) applying logically-equivalent transformations to portions of the third circuit design, (2) resizing one or more circuit elements in the third circuit design, and/or (3) performing rip-up and reroute operations on one or more nets in the third circuit design.

In some embodiments, creating the WLAM for the portion of the first circuit design comprises identifying a set of Maximal Commutative-Associative Logic Functions (MCALFs) in the first circuit design.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design and Manufacturing

IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results (QoR). Some examples of IC design steps and the associated software tools are described below. These examples are for illustrative purposes only and are not intended to limit the embodiments to the forms disclosed.

Some IC design software tools enable IC designers to describe the functionality that the IC designers want to implement. These tools also enable IC designers to perform what-if planning to refine functionality, check costs, etc.

During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence with the HDL code. Embodiments described herein can be used in multiple steps of the IC design flow. Specifically, some embodiments can be used during logic design and/or synthesis.

During design planning, an overall floorplan for the chip can be constructed and analyzed for timing and top-level routing. During physical implementation, circuit elements can be positioned in the layout and can be electrically coupled.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Overview

Logic synthesis systems often create circuit structures which when placed using a place-and-route system, cause routing congestion. Such circuit structures are result of arbitrary decisions made during logic synthesis, where impact on the post-placement wire-length is not known or difficult to assess. This type of congestion is sometimes called open-sea congestion, because it is purely caused by routing interconnects of the given circuit structures.

Figure 1:
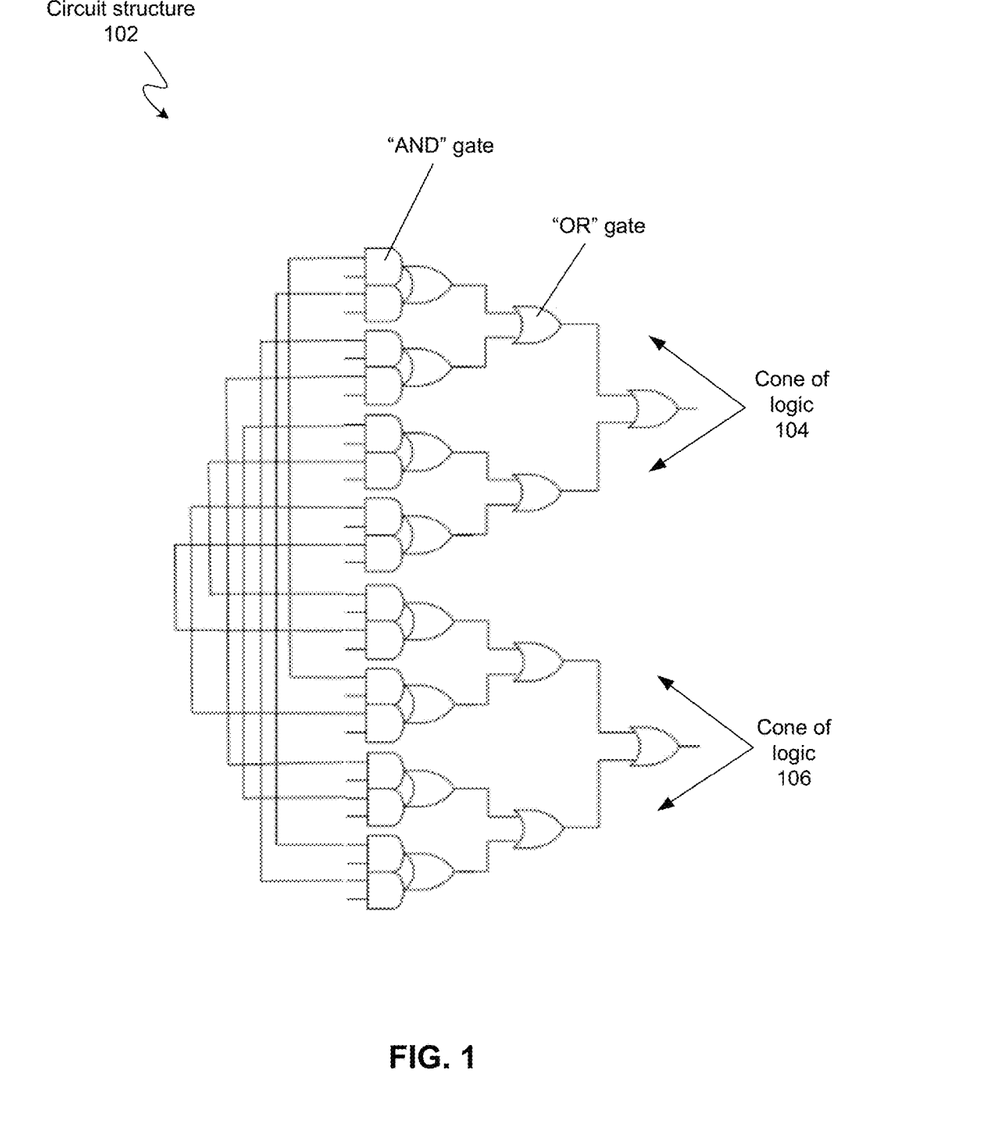
FIG. 1 illustrates an example of a structure than can cause open-sea congestion in accordance with some embodiments described herein.

FIG. 1 illustrates an example of a structure than can cause open-sea congestion in accordance with some embodiments described herein. As shown in FIG. 1, circuit structure 102 is a network of "AND" and "OR" gates. When circuit structure 102 is placed as part of a design using existing tools, leaf-level logic gates are forced in conflicting directions due to connectivity of the common wires between the two cones of logic 104 and 106. The conflicting pull on the logic gates causes the wires connected to them to become longer. Such long wire crossings are one of the fundamental causes of the open-sea congestion.

Conventional method for alleviating such congestion is cell-expansion scheme during placement, which given sufficient routing resources and placement area can solve the problem; however, in practice, real designs have hard limit on such resources, and congestion often remains unmitigated.

When customers encounter such situations, sometimes their only choice is to go back to expensive logic synthesis step with altered guidance and constraints hoping to get circuit structures that will cause less routing congestion during placement; or, spend more placement and routing resources to further mitigate the congestion.

Since the routing congestion problem describe above is caused by circuit structures, the solution is to restructure the logic such that routing congestion is alleviated. Some embodiments described herein use a combination of placement algorithms, routing, commutative-associative properties of logic functions and technology-mapping to transform the original circuit to a new logically-equivalent circuit, which when placed has significantly less wire-length, resulting in alleviated congestion.

Placement-Based Congestion-Aware Logic Restructuring

Figure 2A:
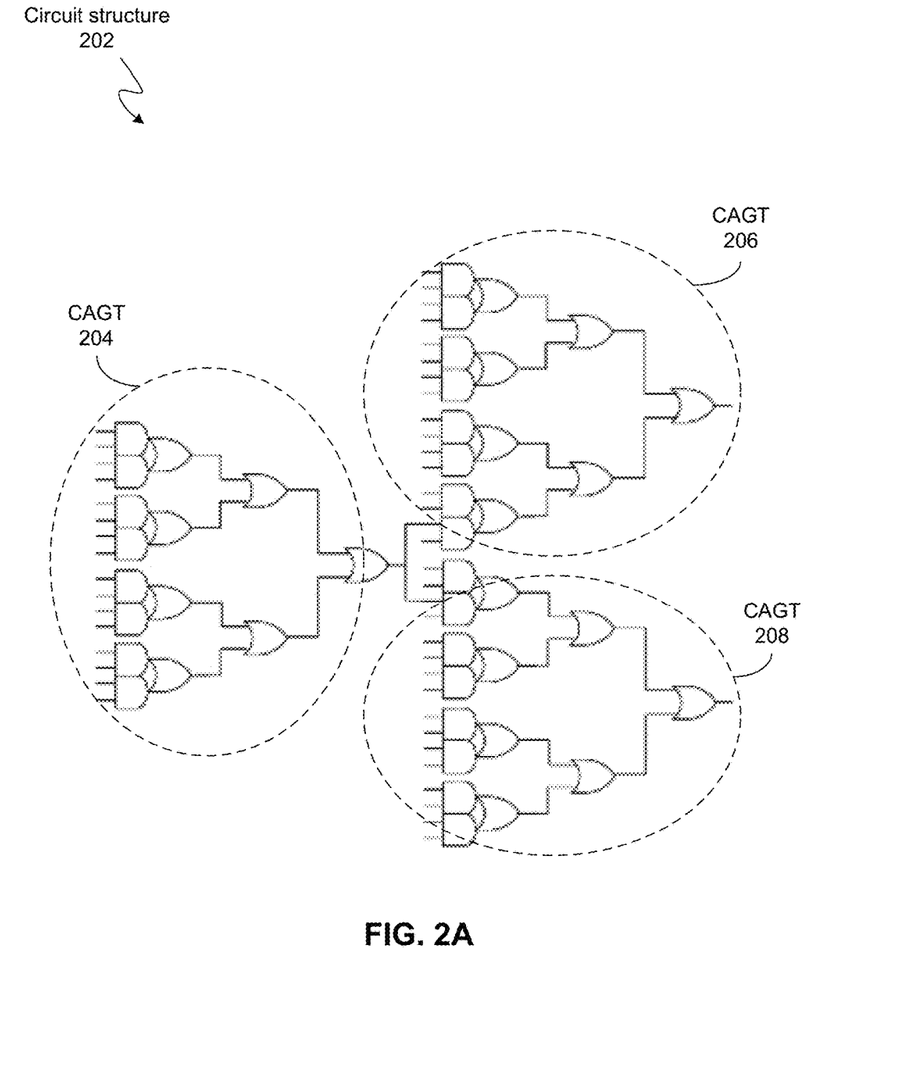
FIG. 2A illustrates a set of Commutative-Associative Gate Trees (CAGTs) in accordance with some embodiments described herein.

Some embodiments begin by creating abstractions in the circuit design. Specifically, some embodiments identify a set of Commutative-Associative Gate Trees (CAGTs), wherein each CAGT comprises combinational circuit elements (logic gates), which may include MUXes and XOR gates. FIG. 2A illustrates a set of CAGTs in accordance with some embodiments described herein. As shown in FIG. 2A, CAGTs 204, 206, and 208 have been identified in circuit structure 202. Note that each CAGT shown in FIG. 2A comprises "AND" and "OR" logic gates.

Figure 2B:
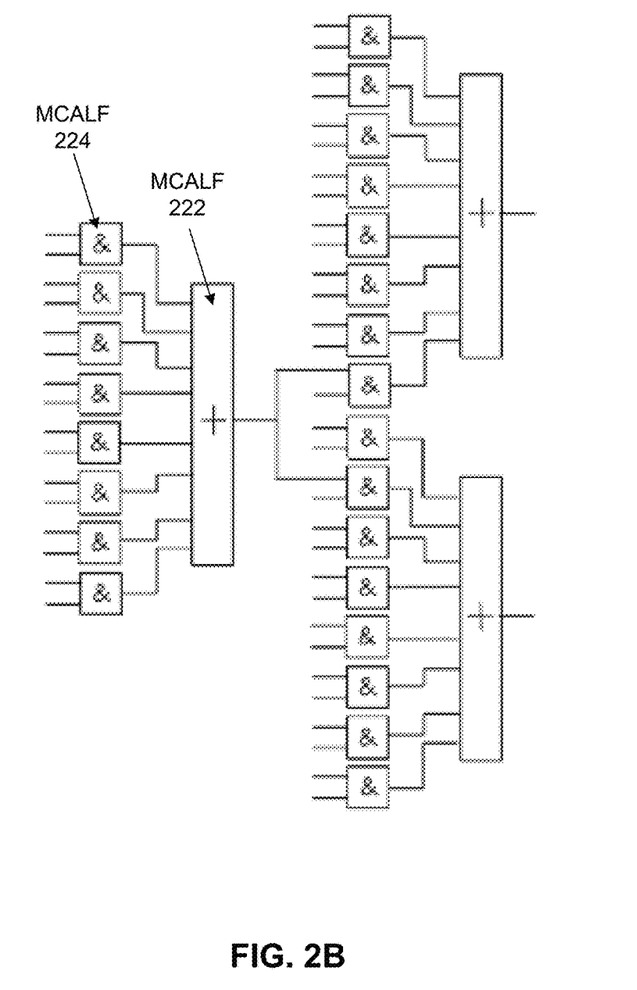
FIG. 2B illustrates how Maximal Commutative-Associative Logic Functions (MCALFs) can be extracted from each CAGT in accordance with some embodiments described herein.

Next, for each CAGT, the embodiments can use Boolean logic manipulation techniques to extract Maximal Commutative-Associative Logic Functions (MCALFs). FIG. 2B illustrates how MCALFs can be extracted from each CAGT in accordance with some embodiments described herein. CAGT 204 includes a logic tree of seven "OR" gates. This logic tree of "OR" gates essentially implements a logic "OR" function of eight logic inputs. In FIG. 2B, this logic tree of "OR" gates is represented by MCALF 222. Each "AND" gate in CAGT 204 is represented by a separate MCALF, such as MCALF 224.

Figure 2C:
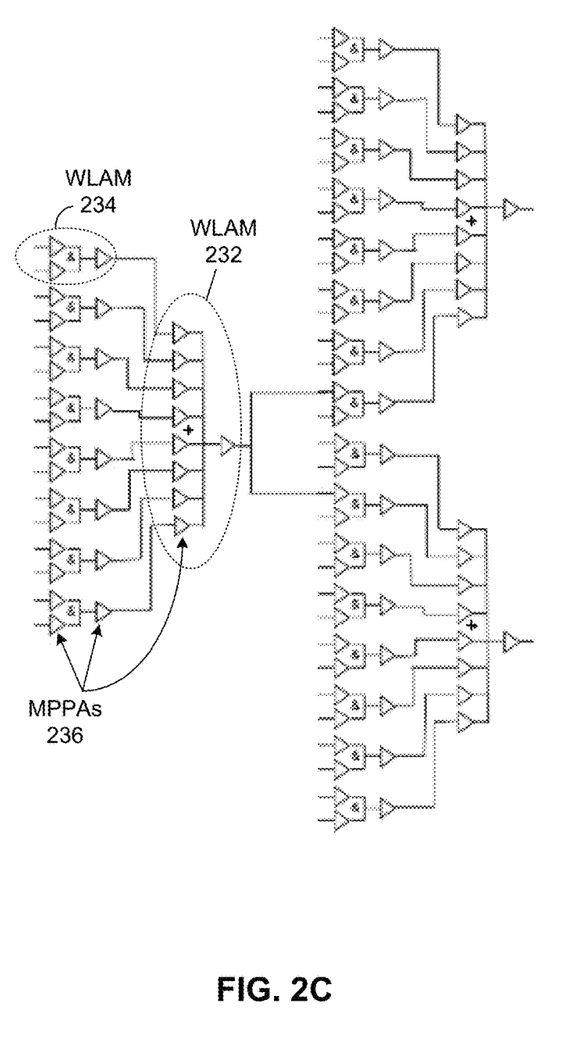
FIG. 2C illustrates Wire-Length-Area-Models (WLAMs) and Multi-Pin-Placement-Abstractions (MPPAs) in accordance with some embodiments described herein.

For each MCALF, the embodiments can create an abstraction for placement, which is called a Wire-Length-Area-Model (WLAM). Each WLAM comprises multi-pin placement elements (called Multi-Pin-Placement-Abstraction, or MPPA for short) that correspond to the MCALF inputs and an output. FIG. 2C illustrates WLAMs and MPPAs in accordance with some embodiments described herein. WLAMs 232 and 234 in FIG. 2C correspond to MCALFs 222 and 224, respectively, in FIG. 2B. In FIG. 2C, each small triangle is an MPPA, e.g., MPPAs 236.

Figure 2D:
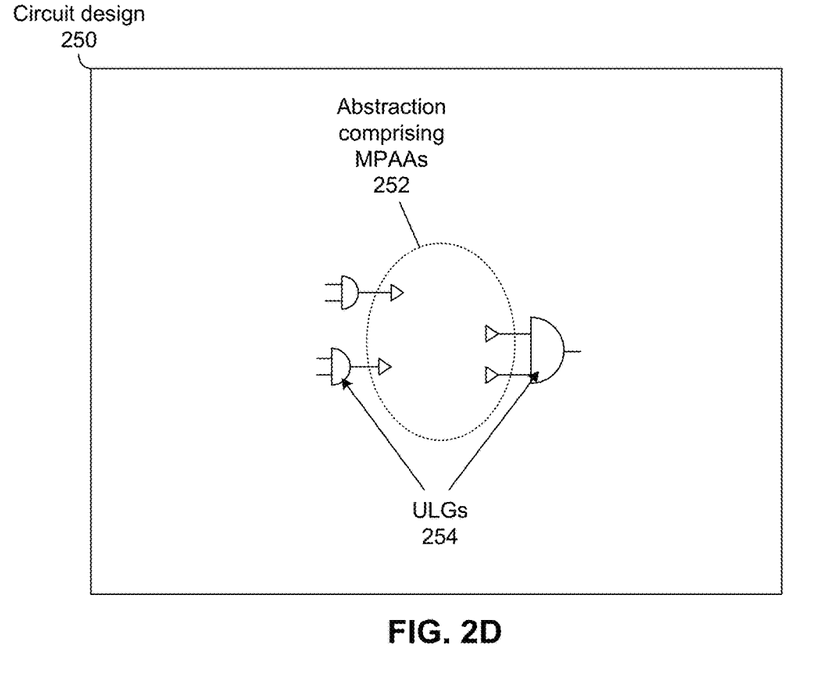
FIG. 2D illustrates a circuit design after a portion of the circuit design has been abstracted using MPPAs in accordance with some embodiments described herein.

At this point in the process, the original logic corresponding to MCALFs is replaced by the set of MPPAs and connected to the Un-Manipulated Logic Gates (ULGs) in the entire design. FIG. 2D illustrates a circuit design after a portion of the circuit design has been abstracted using MPPAs in accordance with some embodiments described herein. Specifically, a portion of circuit design 250 has been abstracted to obtain abstraction comprising MPPAs 252. The remaining circuit elements of circuit design 250 comprise ULGs, such as ULGs 254. These ULGs are electrically connected to MPPAs in the abstraction comprising MPPAs 252 as shown in FIG. 2D. The ULGs are logic gates in the entire design that have not been abstracted into a set of MPPAs. The connectivity among the MPPAs and the ULGs creates the placement constraints that drives the placement of MPPAs of the MCALFs.

Next, the embodiments place the entire circuit, e.g., circuit design 250, which includes all MPPAs (e.g., the MPPAs in abstraction comprising MPPAs 252) and the ULGs (e.g., ULGs 254). Note that the placement of the MPPAs is guided by their connectivity to the ULGs and other PPS s. Since the placer is provided the connectivity among all MPPAs and ULGs, it has the complete freedom to place the MPPAs and ULGs to achieve best wire-length, one of its objectives. The placer effectively places many MCALFs via MPPAs simultaneously, untangling their connectivity at MPPAs level, providing the best possible placement, especially for cascaded and/or interconnected MPPAs and the surrounding ULGs.

The embodiments can then use the valid locations for MCALFs' inputs and outputs, represented by MPPAs, to reconstruct their functions in the next step. Specifically, once the design is placed, all the circuit elements have valid locations, including MPPAs and ULGs. In order to reconstruct the MCALFs in terms of a mapped circuit which will have the best wire-length, we use the routing and technology-mapping as explained below.

Figure 3A:
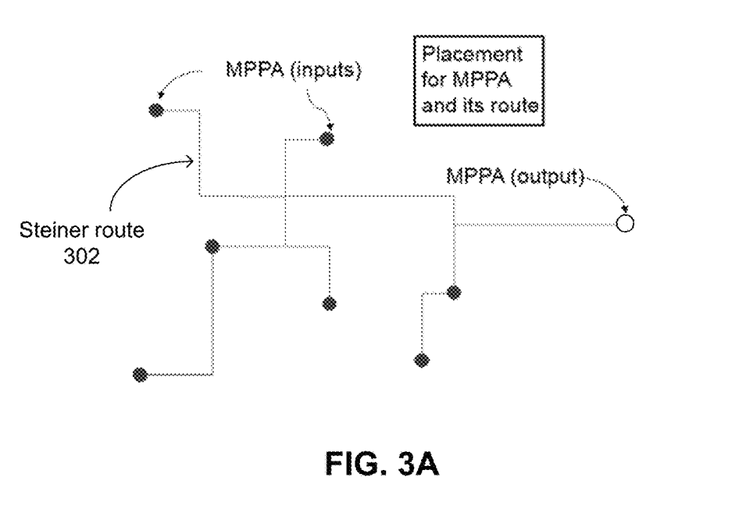
FIG. 3A illustrates how a Steiner route can be created for a placed WLAM by using locations of its MPPAs in accordance with some embodiments described herein.

First, for each placed WLAM, using locations of its MPPAs, we create a Steiner route. FIG. 3A illustrates how a Steiner route can be created for a placed WLAM by using locations of its MPPAs in accordance with some embodiments described herein. Specifically, Steiner route 302 (shown by the network of lines) can be created for the set of input MPPAs (shown by shaded circles) and output MPPA (shown by an unshaded circle) that were placed in the previous step.

Figure 3B:
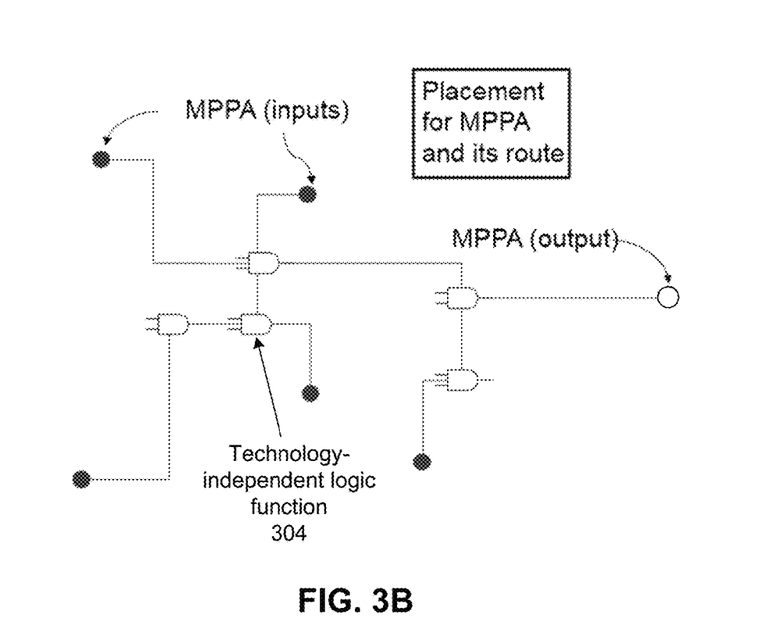
FIG. 3B illustrates how a technology-independent logic function can be created in accordance with some embodiments described herein.

Next, at each of the Steiner-points in the route above, a technology-independent logic function can be created corresponding to the original MCALF. FIG. 3B illustrates how a technology-independent logic function can be created in accordance with some embodiments described herein. Note that the embodiment maintains the correspondence between the MPPAs and the original MCALF, and it can use this correspondence to place the appropriate logic function at the Steiner points. The connectivity among the technology-independent gates (with locations of the corresponding Steiner-points) provide the decomposition for the MCALF. The embodiments use this route-driven logic decomposition for technology mapping, which when mapped to library gates, results in the best wire-length for the mapped design.

At this point in the process, the MCALFs have been restructured and mapped, which un-tangles them and provides the best possible wire-length, thereby resulting in significantly less wire-length and congestion in the circuit design. Next, circuit design can be optimized to improve timing, and to improve other metrics such as area and leakage power.

Figure 4:
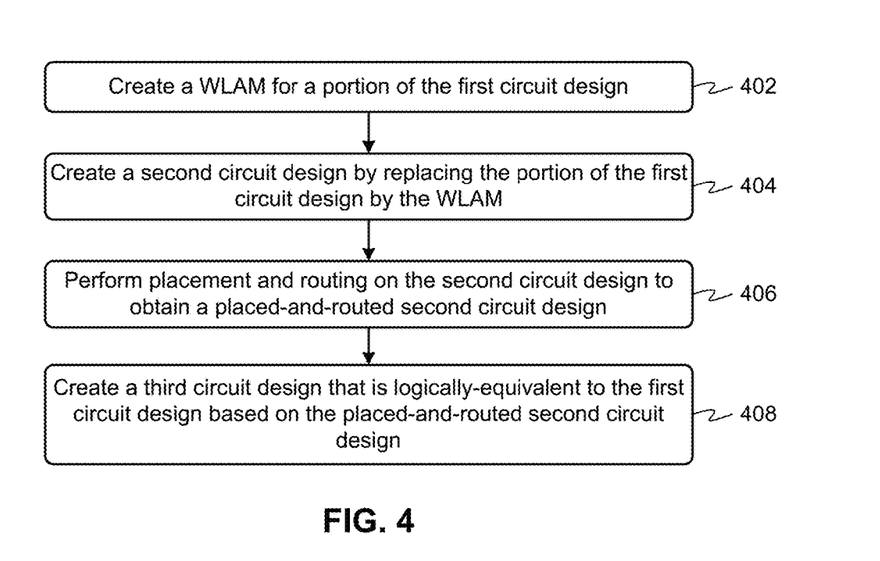
FIG. 4 presents a flowchart that illustrates a process for placement-based congestion-aware logic restructuring in accordance with some embodiments described herein.

FIG. 4 presents a flowchart that illustrates a process for placement-based congestion-aware logic restructuring in accordance with some embodiments described herein. Specifically, the process can transform a circuit design into a logically-equivalent circuit design that significantly reduces congestion during routing. The process can begin by creating a WLAM for a portion of the first circuit design (step 402). Next, the process can create a second circuit design by replacing the portion of the first circuit design by the WLAM (step 404). The process can then perform placement and routing on the second circuit design to obtain a placed-and-routed second circuit design (step 406). Next, a third circuit design can be created that is logically-equivalent to the first circuit design based on the placed-and-routed second circuit design (step 408).

Figure 5:
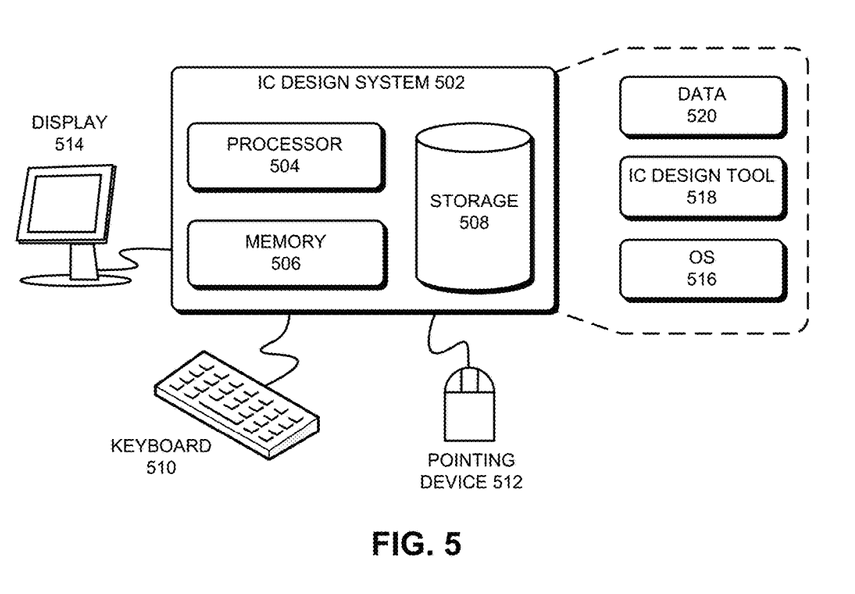
FIG. 5 illustrates an IC design system in accordance with some embodiments described herein.

The term "IC design system" generally refers to a hardware-based system that facilitates designing ICs. FIG. 5 illustrates an IC design system in accordance with some embodiments described herein. IC design system 502 can include processor 504, memory 506, and storage device 508. Specifically, memory locations in memory 506 can be addressable by processor 504, thereby enabling processor 504 to access (e.g., via load/store instructions) and manipulate (e.g., via logical/floating point/arithmetic instructions) the data stored in memory 506. IC design system 502 can be coupled to display device 514, keyboard 510, and pointing device 512. Storage device 508 can store operating system 516, IC design tool 518, and data 520. Data 520 can include input required by IC design tool 518 and/or output generated by IC design tool 518.

IC design system 502 may automatically (or with user help) perform one or more operations that are implicitly or explicitly described in this disclosure. Specifically, IC design system 502 can load IC design tool 518 into memory 506, and IC design tool 518 can then be used to create a database of optimal circuit implementations, and to optimize IC designs by using the database.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions for an integrated circuit (IC) design tool that, when executed by a computer, cause the computer to perform a method for transforming a circuit design into a logically-equivalent circuit design, the method comprising:
creating a second circuit design based on a first circuit design by:
identifying a set of Commutative-Associative Gate Trees (CAGTs) in the first circuit design; and
for each CAGT in the set of CAGTs, (1) identifying a set of Maximal Commutative-Associative Logic Functions (MCALFs) in the CAGT, (2) creating a Wire-Length-Area Model (WLAM) for the set of MCALFs, and (3) replacing the CAGT with the WLAM;

placing and routing the second circuit design to obtain a placed-and-routed second circuit design; and creating a third circuit design that is logically-equivalent to the first circuit design by replacing each WLAM in the second circuit design by a logic network that is logically-equivalent to the CAGT that was replaced by the WLAM.

2. The non-transitory computer-readable storage medium of claim 1, wherein placing and routing the second circuit design to obtain a placed-and-routed second circuit design comprises using a Steiner router.

3. The non-transitory computer-readable storage medium of claim 2, wherein creating the third circuit design that is logically-equivalent to the first circuit design by replacing each WLAM in the second circuit design by a logic network that is logically-equivalent to the CAGT that was replaced by the WLAM comprises placing logic gates on Steiner points in the placed-and-routed second circuit design.

4. The non-transitory computer-readable storage medium of claim 1, wherein performing placement and routing on the third circuit design results in substantially less routing congestion than performing placement and routing on the first circuit design.

5. The non-transitory computer-readable storage medium of claim 1, wherein timing metrics, leakage power metrics, and area metrics of the third circuit design are optimized by (1) applying logically-equivalent transformations to portions of the third circuit design, (2) resizing one or more circuit elements in the third circuit design, and/or (3) performing rip-up and reroute operations on one or more nets in the third circuit design.

6. An apparatus, comprising:
a processor; and
a non-transitory computer-readable storage medium storing instructions for an integrated circuit (IC) design tool that, when executed by the processor, cause the apparatus to perform a method for transforming a circuit design into a logically-equivalent circuit design, the method comprising:
creating a second circuit design based on a first circuit design by:
identifying a set of Commutative-Associative Gate Trees (CAGTs) in the first circuit design; and
for each CAGT in the set of CAGTs, (1) identifying a set of Maximal Commutative-Associative Logic Functions (MCALFs) in the CAGT, (2) creating a Wire-Length-Area Model (WLAM) for the set of MCALFs, and (3) replacing the CAGT with the WLAM;
placing and routing the second circuit design to obtain a placed-and-routed second circuit design; and
creating a third circuit design that is logically-equivalent to the first circuit design by replacing each WLAM in the second circuit design by a logic network that is logically-equivalent to the CAGT that was replaced by the WLAM.

7. The apparatus of claim 6, wherein placing and routing the second circuit design to obtain a placed-and-routed second circuit design comprises using a Steiner router.

8. The apparatus of claim 7, wherein creating the third circuit design that is logically-equivalent to the first circuit design by replacing each WLAM in the second circuit design by a logic network that is logically-equivalent to the CAGT that was replaced by the WLAM comprises placing logic gates on Steiner points in the placed-and-routed second circuit design.

9. The apparatus of claim 6, wherein performing placement and routing on the third circuit design results in substantially less routing congestion than performing placement and routing on the first circuit design.

10. The apparatus of claim 6, wherein timing metrics, leakage power metrics, and area metrics of the third circuit design are optimized by (1) applying logically-equivalent transformations to portions of the third circuit design, (2) resizing one or more circuit elements in the third circuit design, and/or (3) performing rip-up and reroute operations on one or more nets in the third circuit design.

11. A method for transforming a circuit design into a logically-equivalent circuit design, comprising:
creating a second circuit design based on a first circuit design by:
identifying a set of Commutative-Associative Gate Trees (CAGTs) in the first circuit design; and
for each CAGT in the set of CAGTs, (1) identifying a set of Maximal Commutative-Associative Logic Functions (MCALFs) in the CAGT, (2) creatine a Wire-Length-Area Model (WLAM) for the set of MCALFs, and (3) replacing the CAGT with the WLAM;
placing and routing the second circuit design to obtain a placed-and-routed second circuit design; and
creating a third circuit design that is logically-equivalent to the first circuit design by replacing each WLAM in the second circuit design by a logic network that is logically-equivalent to the CAGT that was replaced by the WLAM.

12. The method of claim 11, wherein placing and routing the second circuit design to obtain a placed-and-routed second circuit design comprises using a Steiner router.

13. The method of claim 12, wherein creating the third circuit design that is logically-equivalent to the first circuit design by replacing each WLAM in the second circuit design by a logic network that is logically-equivalent to the CAGT that was replaced by the WLAM comprises placing logic gates on Steiner points in the placed-and-routed second circuit design.

14. The method of claim 11, wherein performing placement and routing on the third circuit design results in substantially less routing congestion than performing placement and routing on the first circuit design.

15. The method of claim 11, wherein timing metrics, leakage power metrics, and area metrics of the third circuit design are optimized by (1) applying logically-equivalent transformations to portions of the third circuit design, (2) resizing one or more circuit elements in the third circuit design, and/or (3) performing rip-up and reroute operations on one or more nets in the third circuit design.

* * * * *